United States Patent
Mater

(10) Patent No.: US 7,456,976 B2
(45) Date of Patent: Nov. 25, 2008

(54) STATISTICAL METHOD OF GENERATING A SYNTHETIC HOLOGRAM FROM MEASURED DATA

(75) Inventor: Michael J. Mater, Chelsea, MI (US)

(73) Assignee: Coherix, Inc., Ann Arbor, MI (US)

( * ) Notice: Subject to any disclaimer, the term of this patent is extended or adjusted under 35 U.S.C. 154(b) by 102 days.

(21) Appl. No.: 11/194,097

(22) Filed: Jul. 29, 2005

(65) Prior Publication Data

US 2007/0024867 A1    Feb. 1, 2007

(51) Int. Cl.
  *G01B 11/02* (2006.01)
(52) U.S. Cl. .................................................. 356/512
(58) Field of Classification Search ................ 356/497, 356/511–514
See application file for complete search history.

(56) References Cited

U.S. PATENT DOCUMENTS

| 5,907,404 | A | 5/1999 | Marron |
| 5,926,277 | A * | 7/1999 | Marron et al. ............... 356/512 |
| 2003/0142317 | A1 | 7/2003 | Mater |
| 2005/0002041 | A1 | 1/2005 | Mater |
| 2007/0024866 | A1 | 2/2007 | Nisper |
| 2007/0024867 | A1 | 2/2007 | Mater |

* cited by examiner

*Primary Examiner*—Tarifur R Chowdhury
*Assistant Examiner*—Jonathon D Cook
(74) *Attorney, Agent, or Firm*—Jeffrey Schox

(57) ABSTRACT

Multiwavelength interferometric images have the phase and/or frequency of the illuminating light corrected by statistically analyzing the data, and adjusting the phase and/or frequency until a statistical measure reaches a criterion.

24 Claims, 3 Drawing Sheets

STATISTICAL METHOD OF GENERATING A SYNTHETIC HOLOGRAM FROM MEASURED DATA

FIELD OF THE INVENTION

The field of the invention is the field of measuring surface topography of an object.

BACKGROUND OF THE INVENTION

Interferometry has been used for over a century to measure the surface topography of objects, typically optical components, and distances and small changes in such distances. With the advent of lasers having long coherence lengths and high brightness, the field has expanded greatly. Interferometric imaging, as depicted by FIG. 1, has been difficult to implement for objects with surfaces with steps or slopes greater than a half wavelength of light per resolution element of the imaging system, because the phase count is lost, and the height of the surface is known only modulo $\lambda/2$, where $\lambda$ is the wavelength of light used for the interferometer.

If a series of interferograms are recorded with different wavelengths $\lambda_i$, the ambiguity in the phase may be resolved, and the heights on the object surface relative to a particular location on the particle surface may be calculated, as is shown in the patents cited below.

RELATED PATENTS AND APPLICATIONS

U.S. Pat. No. 5,907,404 by Marron, et al. entitled "Multiple wavelength image plane interferometry" issued May 25, 1999;

U.S. Pat. No. 5,926,277 by Marron, et al. entitled "Method and apparatus for three-dimensional imaging using laser illumination interferometry" issued Jul. 20, 1999;

U.S. Patent Application 20050002041 filed Jul. 16, 2004 by Michael Mater entitled "Object imaging system using changing frequency interferometry method";

U.S. Patent Application 20030142317 filed Jan. 23, 2003 by Michael Mater entitled "Interferometry method based on changing frequency";

U.S. Patent Application 20070024866 filed Jul. 14, 2005 by inventors Jon Nisper, Mike Mater, Alex Klooster, Zhenhua Huang entitled "A method of combining holograms";

U.S. Patent Application 20060181714 filed Jul. 29, 2005 by inventor Mike Mater et. al entitled "Method for processing multiwavelength interferometric imaging data".

The above identified patents and patent applications are assigned to the assignee of the present invention and are incorporated herein by reference in their entirety including incorporated material.

OBJECTS OF THE INVENTION

It is an object of the invention to produce a method of recording interferograms and treating data to increase accuracy.

SUMMARY OF THE INVENTION

Intensity data for $m_{max}$ interferometric images of an object surface is recorded for a number $m_{max}-1$ relative phase differences between an object beam and a reference beam, and statistical methods of treating the data from a plurality of pixels of the recordings is used to determine accurate values for the $m_{max}-1$ phase differences used for recording the interferograms. The pixels used for the data collection are pixels which satisfy a quality criterion. The corrected phase differences are then used to produce a synthetic phase image of the object surface. Intensity data for $n_{max}$ different wavelengths of light is treated in the same way to determine both the relative phase differences for each wavelength, and wavelengths more accurately than can be determined from the settings used to set wavelengths and phases.

DETAILED DESCRIPTION OF THE INVENTION

Figure 1:
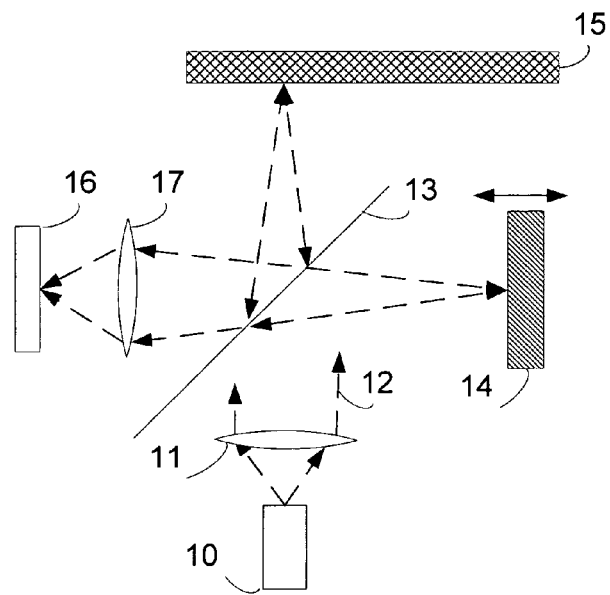
FIG. 1 is a sketch of an interferometric imaging system.
Figure 2:
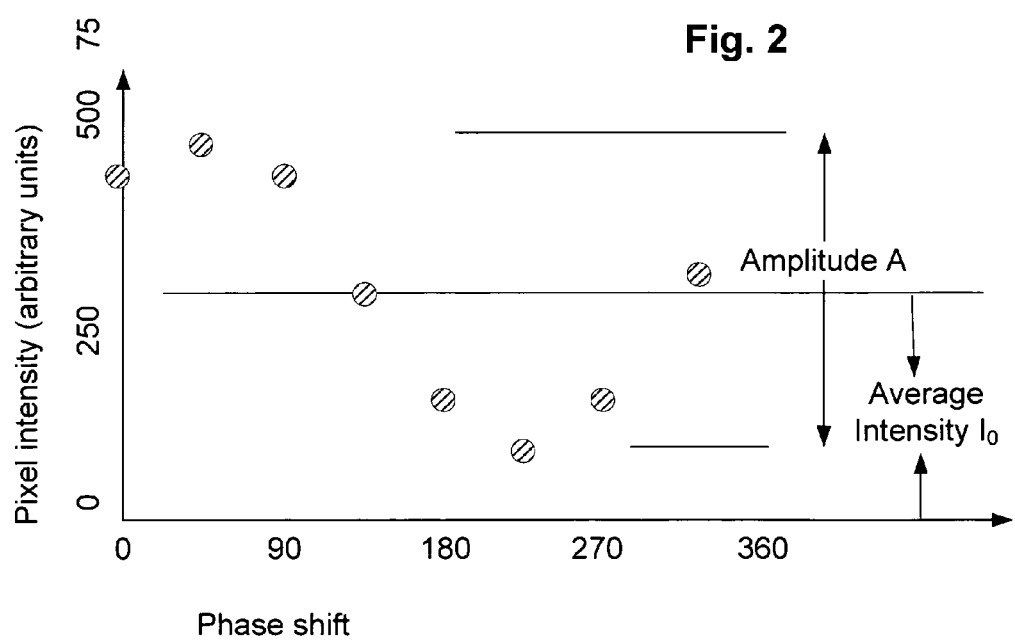
FIG. 2 is a plot of intensity measured for a single pixel vs approximate phase.
Figure 3:
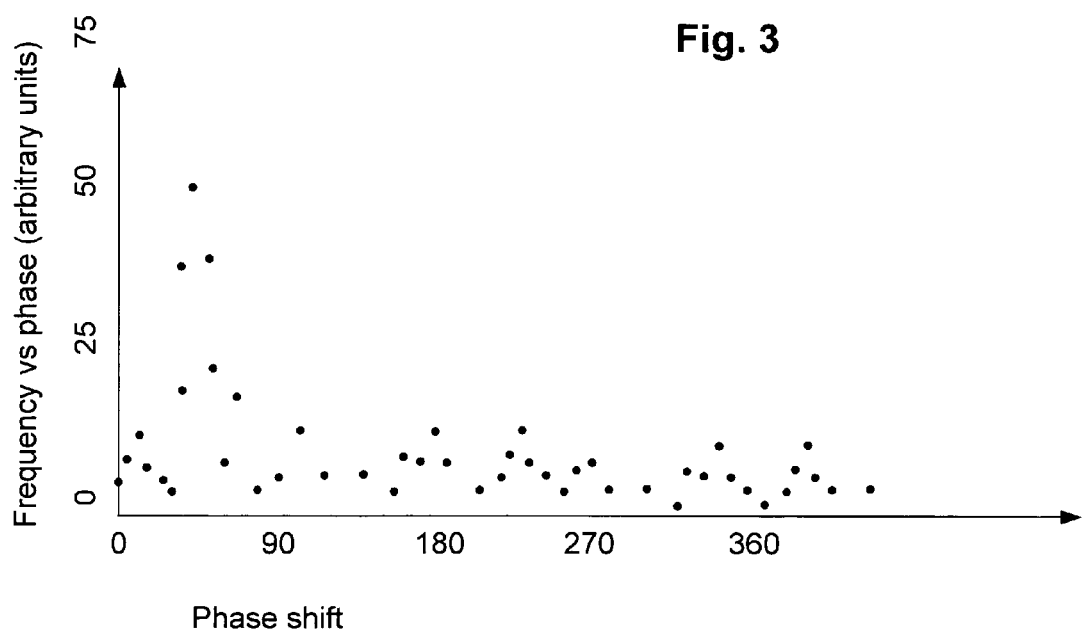
FIG. 3 is a plot of a fast fourier transform of frequency vs phase from data like FIG. 2.

A number of n measurements for synthetic holography at each of a number m of wavelengths $\lambda_n$ of light are made to determine the phase of light scattered from an object and received at an image receiver such as film, or an electronic CMOS or CCD array detector. FIG. 1 shows the interferometric imaging diagram. A light source 10, preferably a laser such as a gas laser, solid state laser, semiconductor injection laser, or a device for parametric generation of coherent light produces light output which is converted into a beam 12 by a lens 11. The beam 12 is split by a beamsplitter 13 into two parts, one part which illuminates an object 15, the other part which illuminates a reference surface 14. The reference surface 14 may be a specularly reflecting surface, a diffusely scattering surface, or any combination of the two. Light scattered from the reference surface 14 and the object 15 is combined at the beamsplitter 13 and propagates to the lens 17, which images both the surface of the object 15 and the surface of the reference surface 14 on to an image detector 16. Preferably, an image is exposed, and the reference surface 14 in the reference beam is moved to change the relative phase of the reference beam with respect to the object beam measured at the image receiver. The image recorded for each relative phase difference is called a phase image. Preferably, a number n images are exposed, each most preferably with at least 8 bit intensity resolution for each pixel for an electronic camera. More preferably 10, 12 or 14 bit intensity resolution is used. FIG. 2 shows a sketch of the intensity measured by a representative pixel as the reference mirror is stepped with approximately 90 degree phase change between each image. In prior art systems, a pixel is chosen as a reference pixel, and the phase data relative to that pixel is then reduced by FFT to a single phase number for each pixel with of bits. In the prior art system, the FFT is very fast, and reduces the data from, say, 84 bits to 4 bits for each pixel for each wavelength $\lambda_n$. Prior art computer systems could then handle the data fast enough to give reasonable results in a reasonable time. However, there is a lot of information in the bits so discarded. The following disclosure teaches how to treat the normally discarded data to improve the accuracy of the measurements. In essence, the disclosure shows how to replace expensive optical equipment with cheap computer power, which becomes cheaper by a factor of 4 every 3 years.

In prior art systems, light from a laser speckle pattern can spill over and contribute to the signal measured by surrounding pixels, especially if the surface is not in focus. When a pixel is chosen as the reference pixel, the surface which has the same scatter properties as the surface imaged on to the
} reference pixel is well measured, but other surfaces, for example, surfaces which are closer and further from the surface than the reference pixel, or surfaces with changes in texture, is less well measured. Another problem with the prior art is that phase changes in the reference arm of the interferometer are not set accurately enough due to time lags in moving mechanical parts and hysteresis in the piezo drivers for moving the reference phase surface. If the wavelengths of the laser used to expose the interferograms is changed, it will not be set accurately enough for the same reason.

The present invention solves the prior art problems by not using a single reference pixel to give a "zero" of the phase map or phase image. Rather, a set of pixels is identified as "good" pixels by some measure, and the phase and/or frequency relationship among the set of pixels is determined by an iterative or other procedure which minimizes the "error" of the entire set of good pixels. Then, the phases and/or frequencies see n by all pixels in the image are determined with respect to the set.

For a single wavelength hologram, data is taken as the phase of the reference beam is changed. For each phase chosen, intensity signals are recorded from each pixel. For any particular pixel, the intensity signal will rise and fall as the object beam and the reference beam interfere constructively and destructively at the image receiver. The signal will look like a constant signal with a sine wave displaced from the origin by a phase factor, such as is shown in FIG. 2. The amplitude of the variation is preferably used as a measure of the "quality" of the pixel. If the signal at any phase measurement falls below the noise floor or above a saturation level, the pixel is preferably removed from consideration for the "good pixel set".

Another measure of quality of a pixel is the quality of pixels surrounding a particular pixel. A weighted average of the quality of a pixel and its surrounding pixels is preferably used to determine whether a particular pixel is to be included in the "good pixel set".

As a particular example, the amplitude of the variation of a pixel with a variation in signal between the noise floor of 50 counts and the saturation signal of 500 counts could be as much as 450 counts. Preferably, a criterion for inclusion in the set of "good pixels" is defined to be a "quality" or amplitude variation of more than 300 counts. Consider a square block of 9 pixels each of which have an amplitude count of, say, 400, and none of which has any intensity counts below the noise floor or is saturated. The pixel amplitude count is multiplied by 5 for the central pixel, by 3 for the pixels above, below, and to each side of the central pixel, and 2 for each of the pixels at the corner of the block. These numbers are added to give a "quality" count for the central pixel of 10,000. If the quality count of a pixel is above a determined number, it is added to the set of "good" pixels.

Generally, there are far more pixels in the "good pixel set" than are necessary for the accuracy required. A subset of, say, 400 pixels out of, say 40,000 good pixels is preferably done by selecting every one-hundredth pixel. More preferably, the data set is segmented and pixels outside the image of the object of interest are excluded. More preferably still, pixels are selected to give the same number of pixels for each unit area of the object. Preferably, pixels are chosen with density proportional to the importance of the particular portion of the surface, where importance may be, for example, areas of the surface where tighter tolerances are required.

Once the set of 400 pixels is chosen, the Fourier transform of the data for each of the set is taken, and a phase for each pixel is determined by choosing the peak position of the FFT calculated from the n pixel intensities measured at each phase position. In the prior art, for each movement of the reference mirror, the same change of phase determined by the theoretical motion of the reference surface is assigned to each pixel. In the present disclosure, the same change of phase determined by the theoretical motion of the reference mirror is used to make a first approximation of the phases of each pixel. Then a measure of the statistics of the data is taken, such as the ratio of the sum of the peak heights of the 400 pixels to the sum of the sidelobe heights, and a constant is added to the previously used phase difference, the FFT is recalculated, and the ratio is recalculated. The process is continued until the ratio drops below a determined number. In this way, the actual phase difference introduced by the movement of the reference mirror can be measured more accurately than could be predicted by calibration of the reference mirror.

The statistical calculation of the phases may be done in many ways as is known in the art. The essence of the invention is to use the information heretofore discarded in reducing the data set to match the capability of the computer system used and calculate measures which improve the accuracy of the measurement.

In the same way that the measured data can be used to improve the accuracy of the phase measurements for a single wavelength phase image, the data may be used to measure the wavelength change of the laser for a multiwavelength synthetic phase image. The wavelength is approximated by, for example, reading the position of a grating which is rotated to tune the illumination laser. Then a measure of the statistics of the data is taken, such as the ratio of the sum of the peak heights of the 400 pixels to the sum of the sidelobe heights, and a constant is added to the previously used frequency, the FFT is recalculated, and the ratio is recalculated. The process is continued until the ratio drops below a determined number.

Figure 4:
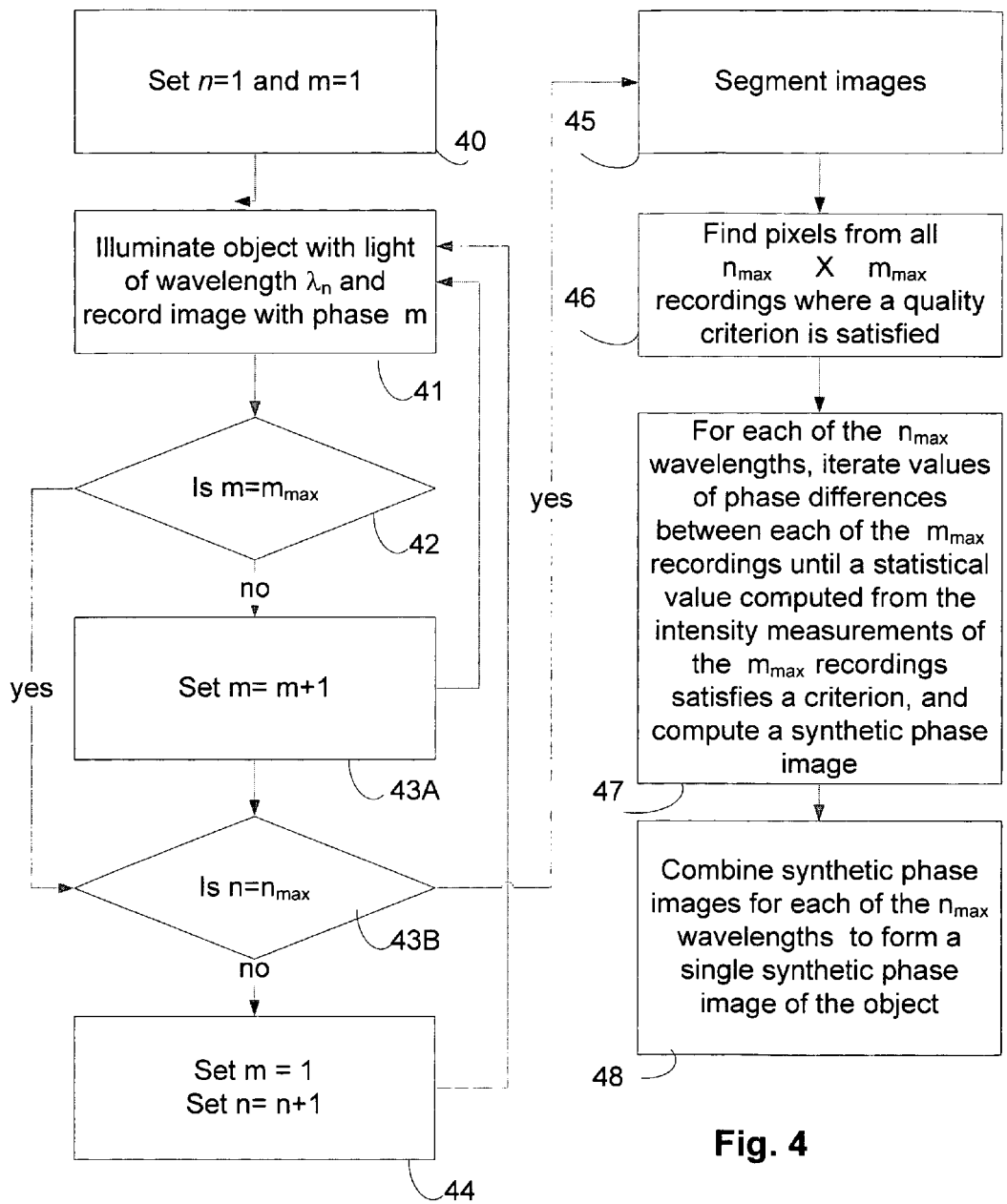
FIG. 4 is a block diagram of the method of the invention.

FIG. 4 shows a block diagram of an iterative method of determining correct phase differences for a single wavelength synthetic phase image.

Use of this algorithm gives an 8:1 decrease in projected error of the height of the surface.

Obviously, many modifications and variations of the present invention are possible in light of the above teachings. It is therefore to be understood that, within the scope of the appended claims, the invention may be practiced otherwise than as specifically described.

I claim:

1. A method, comprising:
  a) recording n interferograms of an object, wherein the n interferograms are recorded by changing the phase difference between an object beam of wavelength $\lambda_k$ and a reference beam of wavelength $\lambda_k$ by approximate phase differences $\partial(\phi)_i$ where i is an integer between 1 and (n-1);
  b) choosing a first plurality of pixels, wherein each pixel intensity measurement or count is greater than a noise floor and less than a saturation value for each of the n interferograms, and wherein each pixel intensity measurement for each of the n interferograms has a variation of more than a defined number of counts; and
  c) adjusting the values $\partial(\phi)_i$ until a statistical measure of intensities recorded for the n interferograms for the plurality of pixels satisfies a criterion, wherein the statistical measurement comprises the steps of: determining Fourier transforms for a first plurality of pixels from the n interferograms of the object; and calculating the average of a ratio of peak heights to sidelobe heights of the Fourier Transforms.

2. The method of claim 1, wherein the first plurality of pixels is restricted to a segmented part of the n interferograms of the object.

3. The method of claim 2, wherein the first plurality of pixels is distributed uniformly over the segmented part of the n interferograms of the object.

4. The method of claim 2, wherein the first plurality of pixels is distributed non-uniformly over the segmented part of the n interferograms of the object.

5. A method, comprising:
  a) recording n interferograms of an object, wherein the n interferograms are recorded by changing the phase difference between an object beam of wavelength $\lambda_k$ and a reference beam of wavelength $\lambda_k$ by approximate phase differences $\partial(\phi)_i$ where i is an integer between 1 and (n-1);
  b) choosing a first plurality of pixels, wherein each pixel intensity measurement or count is greater than a noise floor and less than a saturation value for each of the n interferograms, and wherein each pixel intensity measurement for each of the n interferograms has a variation of more than a defined number of counts; and
  c) adjusting the values $\partial(\phi)_i$ until a statistical measure of intensities recorded for the n interferograms for the plurality of pixels satisfies a criterion, wherein the statistical measurement comprises the steps of: determining Fourier transforms for a first plurality of pixels from the n interferograms of the object; and calculating the average of a ratio of the average of peak heights to the average of sidelobe heights of the Fourier Transforms.

6. The method of claim 5, wherein the first plurality of pixels is restricted to a segmented part of the n interferograms of the object.

7. The method of claim 6, wherein the first plurality of pixels is distributed uniformly over the segmented part of the n interferograms of the object.

8. The method of claim 6, wherein the first plurality of pixels is distributed non-uniformly over the segmented part of the n interferograms of the object.

9. A method, comprising:
  a) recording n interferograms of an object, wherein the n interferograms are recorded by changing the phase difference between an object beam of wavelength $\lambda_k$ and a reference beam of wavelength $\lambda_k$ by approximate phase differences $\partial(\phi)_i$ where i is an integer between 1 and (n-1);
  b) choosing a first plurality of pixels. wherein each pixel intensity measurement or count is greater than a noise floor and less than a saturation value for each of the n interferograms, and wherein each pixel intensity measurement for each of the n interferograms has a variation of more than a defined number of counts;
  c) adjusting the values $\partial(\phi)_i$ until a statistical measure of intensities recorded for the n interferograms for the plurality of pixels satisfies a criterion; and
  d) determining a synthetic phase image of the object from a second plurality of wavelengths $\lambda_H$, wherein the synthetic phase image is a synthetic phase image having a wavelength longer than wavelengths $\lambda_k$.

10. The method of claim 9, wherein the first plurality of pixels is restricted to a segmented part of the n interferograms of the object.

11. The method of claim 10, wherein the first plurality of pixels is distributed uniformly over the segmented part of the n interferograms of the object.

12. The method of claim 10, wherein the first plurality of pixels is distributed non-uniformly over the segmented part of the n interferograms of the object.

13. A method, comprising:
  a) recording n interferograms of an object, wherein the n interferograms are recorded by changing the phase difference between an object beam of wavelength $\lambda_k$ and a reference beam of wavelength $\lambda_k$ by phase differences $\partial(\phi)_i$ where i is an integer between 1 and (n-1);
  b) choosing a first plurality of pixels from the n interferograms;
  c) adjusting the values $\partial(\phi)_i$ until a statistical measure of intensities recorded for the n interferograms for the plurality of pixels satisfies a criterion, wherein the statistical measurement comprises the steps of: determining Fourier transforms for a first plurality of pixels from the n interferograms of the object; and calculating the average of a ratio of peak heights to sidelobe heights of the Fourier Transforms.

14. The method of claim 13, wherein the first plurality of pixels is restricted to a segmented part of the n interferograms of the object.

15. The method of claim 14, wherein the first plurality of pixels is distributed uniformly over the segmented part of the n interferograms of the object.

16. The method of claim 14, wherein the first plurality of pixels is distributed non-uniformly over the segmented part of the n interferograms of the object.

17. A method, comprising:
  a) recording n interferograms of an object, wherein the n interferograms are recorded by changing the phase difference between an object beam of wavelength $\lambda_k$ and a reference beam of wavelength $\lambda_k$ by phase differences $\partial(\phi)_i$ where i is an integer between 1 and (n-1);
  b) choosing a first plurality of pixels from the n interferograms;
  c) adjusting the values $\partial(\phi)_i$ until a statistical measure of intensities recorded for the n interferograms for the plurality of pixels satisfies a criterion, wherein the statistical measurement comprises the steps of: determining Fourier transforms for a first plurality of pixels from the n interferograms of the object; and calculating the average of a ratio of the average of peak heights to the average of sidelobe heights of the Fourier Transforms.

18. The method of claim 17, wherein the first plurality of pixels is restricted to a segmented part of the n interferograms of the object.

19. The method of claim 18, wherein the first plurality of pixels is distributed uniformly over the segmented part of the n interferograms of the object.

20. The method of claim 18, wherein the first plurality of pixels is distributed non-uniformly over the segmented part of the n interferograms of the object.

21. A method, comprising:
  a) recording n interferograms of an object, wherein the n interferograms are recorded by changing the phase difference between an object beam of wavelength $\lambda_k$ and a reference beam of wavelength $\lambda_k$ by phase differences $\partial(\phi)_i$ where i is an integer between 1 and (n-1);
  b) choosing a first plurality of pixels from the n interferograms;
  c) adjusting the values $\partial(\phi)_i$ until a statistical measure of intensities recorded for the n interferograms for the plurality of pixels satisfies a criterion, d) determining a synthetic phase image of the object from a second plurality of wavelengths $\lambda_H$, wherein the synthetic phase image is a synthetic phase image having a wavelength longer than wavelengths $\lambda_k$.

22. The method of claim 21, wherein the first plurality of pixels is restricted to a segmented part of the n interferograms of the object.

23. The method of claim 22, wherein the first plurality of pixels is distributed uniformly over the segmented part of the n interferograms of the object.

24. The method of claim 22, wherein the first plurality of pixels is distributed non-uniformly over the segmented part of the n interferograms of the object.

* * * * *